US 6,824,228 B2

(12) United States Patent
Harris et al.

(10) Patent No.: US 6,824,228 B2
(45) Date of Patent: Nov. 30, 2004

(54) REAR-AXLE DEMAND FOR USE WITH FRONT PUSH-THROUGH IN ELECTROHYDRAULIC (EHB) BRAKING SYSTEMS

(75) Inventors: Alan Leslie Harris, Coventry (GB); Peter Martin, Sutton Coldfield (GB)

(73) Assignee: TRW Limited (GB)

( * ) Notice: Subject to any disclaimer, the term of this patent is extended or adjusted under 35 U.S.C. 154(b) by 0 days.

(21) Appl. No.: 10/412,601

(22) Filed: Apr. 10, 2003

(65) Prior Publication Data

US 2003/0205934 A1 Nov. 6, 2003

Related U.S. Application Data

(63) Continuation of application No. PCT/GB01/04609, filed on Oct. 15, 2001.

(30) Foreign Application Priority Data

Oct. 14, 2000 (GB) .............................................. 0025239

(51) Int. Cl.[7] .............................................. B60T 8/00
(52) U.S. Cl. .............................. 303/155; 303/3; 303/15; 303/113.4; 303/DIG. 3
(58) Field of Search .............................. 303/155, 113.4, 303/15, DIG. 3, DIG. 4, 116.1, 116.2

(56) References Cited

U.S. PATENT DOCUMENTS 6,206,489 B1   3/2001   Schmidt et al.

| 6,345,871 | B1 | * | 2/2002 | Harris et al. | ................. 303/155 |
| 6,582,030 | B2 | * | 6/2003 | Harris | ............................ 303/3 |
| 6,588,855 | B2 | * | 7/2003 | Harris | ......................... 303/20 |
| 6,598,943 | B2 | * | 7/2003 | Harris | ..................... 303/113.4 |

FOREIGN PATENT DOCUMENTS

| DE | 198 07 367 | 8/1999 |
| EP | 0 937 614 | 8/1999 |
| GB | 2 342 968 | 4/2000 |

* cited by examiner

*Primary Examiner*—Matthew C. Graham
(74) *Attorney, Agent, or Firm*—MacMillan, Sobanski & Todd, LLC

(57) ABSTRACT

An electro-hydraulic braking system of the type which operates normally in a brake-by-wire mode wherein hydraulic pressure is applied to braking devices at the vehicle wheels in proportion to the driver's braking demand as sensed electronically at a brake pedal, and which, if the brake-by-wire mode should fail, at least as far as the front brakes are concerned, operates in a push-through mode wherein hydraulic pressures are applied to the braking devices at the front wheels of the vehicle by way of a tandem master cylinder coupled mechanically to the brake pedal, wherein, in the situation where push-through operation has been selected at the front brakes but the rear brakes are continuing to be operated under EHB, a rear brake demand is calculated as a "multiple average" from the expression: $[P2+(P1+P3)/2]/2$ where P1 and P3 are signals from the master cylinder and a front brake sensor in the same push-through circuit and P2 is a signal from the front brake sensor in the other circuit.

8 Claims, 4 Drawing Sheets

REAR-AXLE DEMAND FOR USE WITH FRONT PUSH-THROUGH IN ELECTROHYDRAULIC (EHB) BRAKING SYSTEMS

CROSS REFERENCE TO RELATED APPLICATIONS

This application is a continuation of International Application No. PCT/GB01/04609 filed Oct. 15 2001, which claimed priority to Great Britain Patent Application No. 0025239.5 filed Oct. 14, 2000, the disclosures of which are incorporated herein by reference.

The present invention is concerned with improving efficiency of braking performance in vehicle braking systems, in particular within the context of vehicle braking systems having electro-hydraulic (EHB) braking.

BACKGROUND OF THE INVENTION

A typical EHB system for a vehicle comprises a brake pedal, respective braking devices which are connected to the vehicle wheels and which are capable of being brought into communication with electronically controlled control valves in order to apply hydraulic fluid under pressure to the braking devices, a hydraulic pump driven by an electric motor, and a high pressure hydraulic pressure accumulator fed by said pump for the provision of hydraulic fluid under pressure which can be passed to the braking devices via the electrically controlled valves in order, in so called "brake-by-wire" mode, to apply hydraulic fluid under pressure to the braking devices in proportion to the driver's demand as sensed at the brake pedal. The EHB system is controlled by an electronic controller (ECU). In the case of typical four-wheeled vehicles, there are four said braking devices at the two front wheels and two rear wheels of the vehicle, respectively.

In order to enable the vehicle to be braked in conditions where for some reason the EHB system has become inoperative, for example because of a major component failure, it is usual in vehicles fitted with EHB to include a mechanical back-up system comprising a master cylinder which is linked to the brake pedal and which can be arranged to be coupled hydraulically to respective brake actuators at the front wheels to provide at least some braking in the event of total EHB failure.

This is known as the "push-through" mode of braking. In some circumstances, it is preferable for the master cylinder to be in the form of a tandem cylinder coupled to the brake actuators of the two front wheels of the vehicle by way of separate pressure applicator channels.

In order to make the EHB system "feel" like a conventional braking system in the normal EHB mode of braking, a travel simulator is also usually provided which is connected hydraulically to the master cylinder coupled to the brake pedal and which allows, by increasing the volume under pressure, the brake pedal to be depressed to an extent comparable with that of conventional systems.

It is already known that if a major problem occurs in the EHB system operating the front brakes so that push-through operation at the front brakes is selected, but the EHB system of the rear brakes is still secure, then the rear brakes should continue to be controlled under EHB, but using a pressure-based demand signal based upon the push-through pressure in the front brakes, However, this arrangement has the potential problem that, if there is a hydraulic failure in the master cylinder or one front brake, the master cylinder pressure may be zero so that the rear brake demand for the EHB-controlled rear brakes will also be zero.

It is an object of the present invention to mitigate this problem.

SUMMARY OF THE INVENTION

In accordance with the present invention, in the situation where push-through operation has been selected at the front brakes but the rear brakes are continuing to be operated under EHB, a rear brake demand is established using a combination of the individually measured pressures in both of the front brake actuator circuits and at the master cylinder.

Advantageously, in order to cater for situations where the observed pressures differ, the rear brake demand is calculated as a "multiple average" from the expression:

$$[P2+(P1+P3)/2]/2$$

where P1 and P3 are respectively signals from the master cylinder and a front brake sensor in the same push-through circuit and P2 is a signal from the front brake sensor in the other circuit.

A pedal travel signal can be used to confirm that travel is in the expected range, but a precise reading is not required. Normal pedal-sensor-cross-check errors are preferably suppressed. The travel simulator will preferably also be isolated in this mode.

In a preferred embodiment, EHB control of the rear axle is achieved via a special demand table that uses only the master-cylinder pressure sensor and the two front-brake-pressure sensors.

Critical fault-scenarios determining this formula include high-in-range faults at the master-cylinder pressure (P1), and in some cases leakage from/air in the secondary circuit, For this latter scenario it may be that only one front wheel is braked, and the multiple-average pressure will then be less than the pressure in that brake. To ensure that statutory secondary-braking performance is still available in this case, the demand table should be arranged with a gain factor >1, eg. 2, between the multiple-average control pressure and the rear-brake pressure. This should allow the smaller rear-axle brakes to compensate for the missing front-wheel drag.

In some embodiments, the rear brake pressure can be set up to its maximum, similar to the known Brake Assist (BA) function, and can then be controlled via the ABS to maintain the vehicle stability.

In the case that only one front wheel can be braked in the push-through mode then, for vehicle stability reasons, only the rear wheel which is diagonally opposite to the braked front wheel is braked, at least occasionally.

The latter two situations can be improved further by utilising sensor information from the known Vehicle Stability Control (VSC), eg. the steering angle, the transversal acceleration, or the yaw moment. By this means, it is possible to distinguish if the vehicle is cornering or driving straight and it can be forseen when the vehicle stability is becoming critical.

In an EHB system when a type of failure occurs that needs the system to revert to push-through in some failure cases it is possible to retain the power braking function on the rear axle. In this case, ABS may be retained on the rear axle provided that there is enough wheel speed data from all four wheels. The retention of ABS in this case is a benefit for stability.

If the surface conditions and/or the push-through pressure generated by the driver causes front wheel lock, the two front wheel speed levels are now zero and to retain the ABS on the rear axle results in instability on some surfaces as the slip levels on the rear axle may be excessive (caused by the paucity of wheel speed data). This instability results in spinning out of lane.

In the latter circumstances, two possibilities may be considered as follows:

When the front wheels lock under the above stated conditions, it is arranged for one rear wheel to be under braked to retain a good vehicle speed reference. or Increase the pressure in the rear brakes to ensure that they lock. This will give a good deceleration and will ensure that the car does not pull out of a straight line.

The invention is described further hereinafter, by way of example only, with reference to the accompanying drawings, wherein:

DETAILED DESCRIPTION OF THE INVENTION

Figure 1:
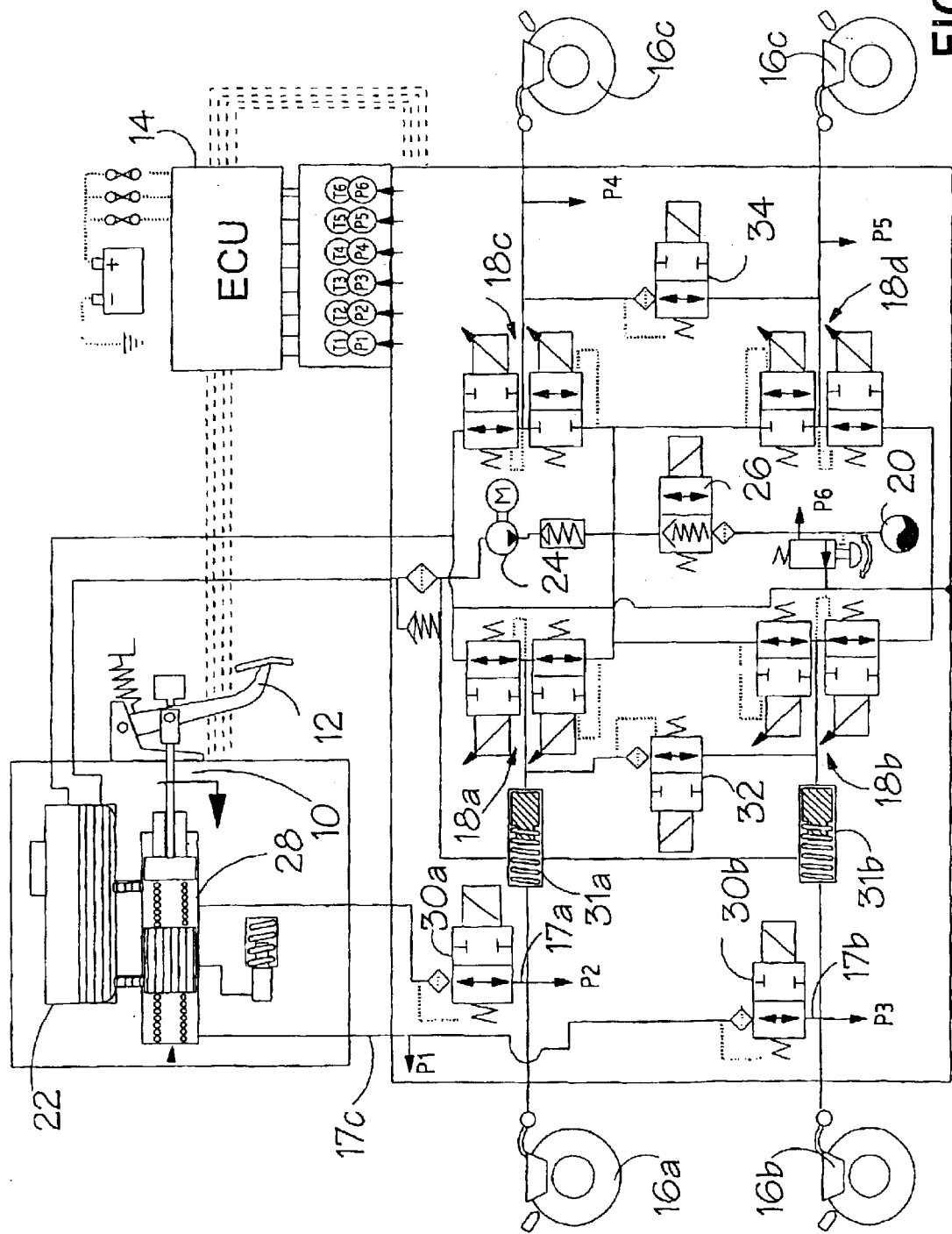
FIG. 1 is a diagrammatic representation of one embodiment of an EHB system to which the present invention is applicable.

FIG. 1 illustrates an electrohydraulic braking system where braking demand signals are generated electronically at a travel sensor 10 in response to operations of a foot pedal 12, the signals being processed in an electronic control unit (ECU) 14 for controlling the operation of front brake actuators 16a, 16b, and rear brake actuators 16c, 16d at the front and back wheels respectively of a vehicle via pairs of valves 18a, 18b and 18c, 18d. The latter valves are operated in opposition to provide proportional control of actuating fluid to the brake actuators 16 from a pressurised fluid supply accumulator 20, maintained from a reservoir 22 by means of a motor-driven pump 24 via a solenoid controlled accumulator valve 26. For use, for example, in emergency conditions when the electronic control of the brake actuators is not operational for some reason, the system includes a tandem master cylinder 28 coupled mechanically to the foot pedal 12 and by which fluid can be supplied directly to the front brake actuators 16a, 16b in a "push-through" condition via respective braking channels 17a and 17b. The pressures in the braking channels of the two front brake actuators 16a, 16b are measured as P2 and P3, respectively. The pressure in the master cylinder channel 17c leading to the brake actuator 16b is measured as P3. In the push-through condition, fluid connections between the front brake actuators 16a, 16b and the cylinder 28 are established by means of digitally operating, solenoid operated valves, 30a, 30b. Also included in the system are further digitally operating valves which respectively connect the two pairs of valves 36a, 36b and the two pairs of valves 18g, 18d.

For the purposes of a first embodiment of the present invention as applied to the system illustrated in the figure, ECU 14 is programmed to calculate the "multiple average" from the expression:

$$[P2+(P1+P3)/2]/2$$

in order to establish a demand pressure for the rear brakes under ESB, or possibly under ABS. This embodiment is illustrated by the sequence flow diagram of FIG. 2 which involves the following sequence steps:

50—EHB system operating the "Front-Axle Push-Through/Rear-Axle EBB" mode.

52—Master-cylinder pressure=P1

54—Front-left brake pressure=P3

56—Front-right pressure=P2

58—Rear-axle demand pressure=f[P2+(P1+P3)/2]/2

Figure 3:
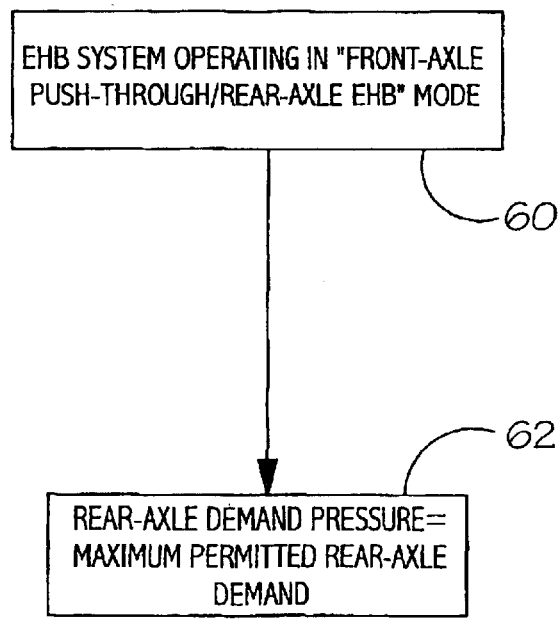

FIG. 3 is a flow diagram illustrating the embodiment of claim 3 where the rear brake pressure is arranged to be set to its maximum value and then controlled via the vehicle ABS such as to maintain vehicle stability. FIG. 3 involves the following sequence steps:

60—EHB system operating in "Front-Axle Push-Through/Rear-Axle EHB" mode.

62—Rear-axle demand pressure=maximum permitted rear-axle demand.

Figure 2:
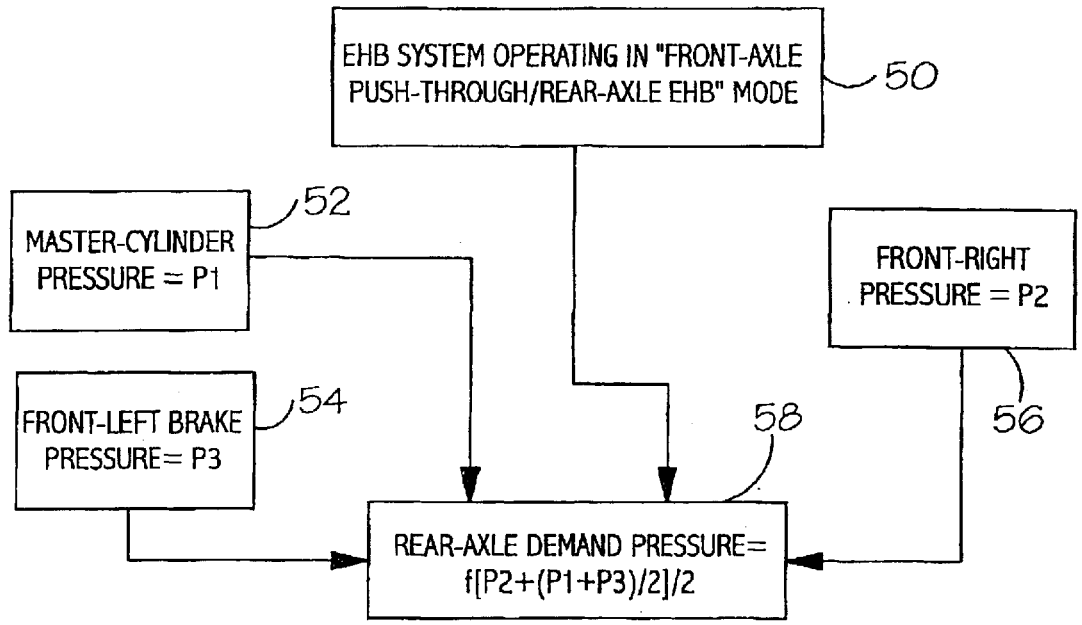
FIGS. 2 to 5 are flow diagrams illustrating embodiments in accordance with the present invention.
Figure 4:
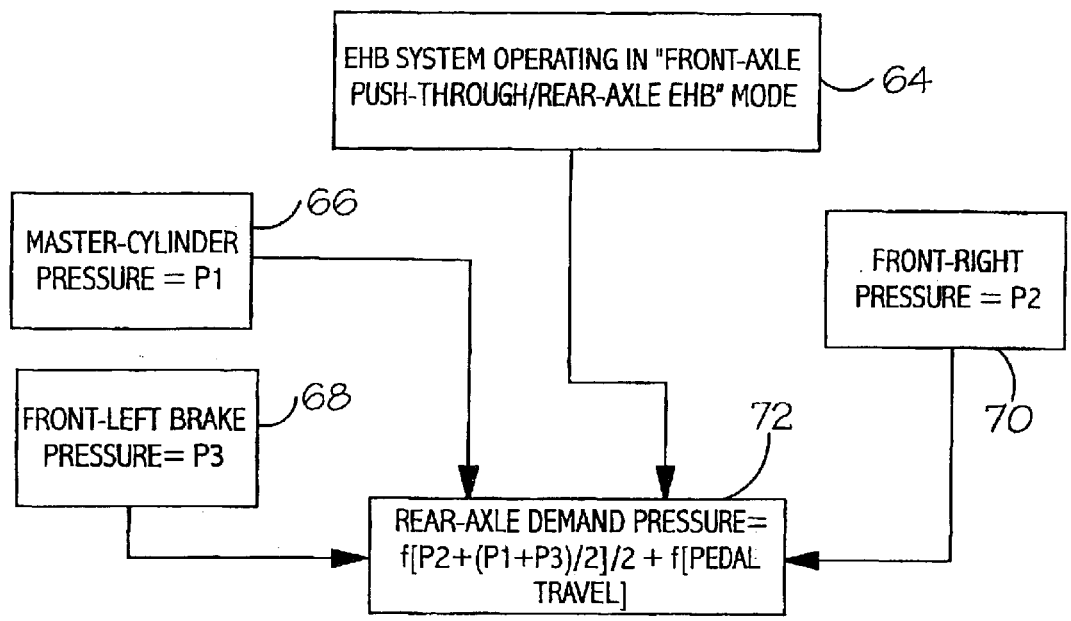

FIG. 4 is a sequence flow diagram illustrating a modified version of the FIG. 2 embodiment wherein the demand is based both upon the pressures P1 and P3 as described above and upon the pedal travel. This may be a proportional function or else a fixed addition if the travel exceeds a predetermined minimum threshold beyond the normal range. FIG. 4 involves the following sequence steps:

64—EHB system operating in "Front-Axle Push-Through/Rear-Axle Push-Through/Rear-Axle EHB" mode.

66—Master-cylinder pressure=P1

68—Front-left brake pressure=P3

70—Front-right pressure=P2

72—Rear-axle demand pressure=f[P2+(P1+P3)/2]/2+f [pedal travel]

Figure 5:
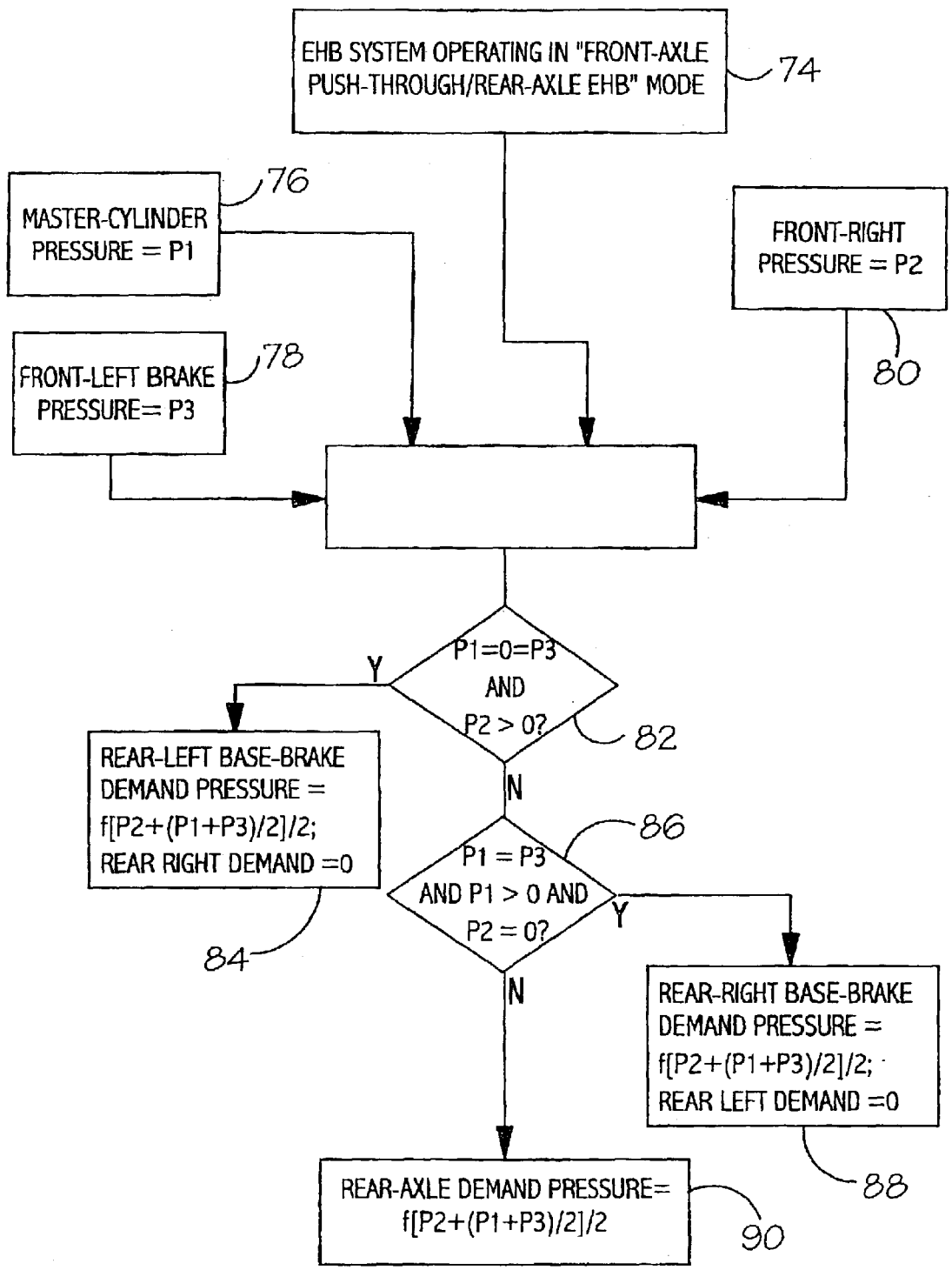

FIG. 5 is a sequence flow diagram illustrating several further embodiments corresponding to subsidiary claims. FIG. 5 involves the following sequence steps:

74—EHB system operating in "Front-Axle Push-Through/Rear-Axle EHB" mode

76—Master-cylinder pressure=P1

78—Front-left brake pressure=P3

80—Front-right pressure=P2

82—P1=0=P3 and P2>0?

84—Rear-left base brake demand pressure=f[P2+(P1+P3)/2]/2 and rear-right demand=0

86—P1=P3 and P1 >0 and P2 =0

88—Rear-right base-brake demand pressure=f[P2+(P1+P3)/2]/2 and rear-left demand=0

90—Rear-axle base-brake demand pressure=f[P2+(P1+P3)/2]/2.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electro-hydraulic braking system of the type which operates normally in a brake-by-wire mode wherein hydraulic pressure is applied to braking devices at the vehicle wheels in proportion to the driver's braking demand as sensed electronically at a brake pedal, and which, if the brake-by-wire mode should fail, at least as far as the front brakes are concerned, operates in a push-through mode wherein hydraulic pressures are applied to the braking devices at the front wheels of the vehicle by way of a tandem master cylinder coupled mechanically to the brake pedal, wherein, in the situation where push-through operation has been selected at the front brakes, but the rear brakes are continuing to be operated under EHB, a rear brake demand is established using a combination of individually measured pressure of the front brake actuators and of the master cylinder.

2. An EHB system as claimed in claim 1, wherein the rear brake demand is calculated as a "multiple average" from the expression:

$$[P2+(P1+P3)/2]/2$$

where P1 and P3 are signals from the master cylinder and a front brake sensor in the same push-through circuit and P2 is a signal from the front brake sensor in the other circuit.

3. An EHB system as claimed in claim 1, wherein the rear brake pressure is arranged to be set to its maximum value and then controlled via the vehicle ABS such as to maintain vehicle stability.

4. An EHB system as claimed in claim 1, wherein in the case that only one front wheel can be braked in the push-through mode, only the rear wheel which is diagonally opposite to the braked front wheel is braked, at least occasionally.

5. An EHB system as claimed in claim 1, wherein EHB control of the rear axle is achieved via a special demand table that uses only the master-cylinder pressure server and the two front-brake-pressure sensors.

6. An EHB system as claimed in claim 1, having means whereby, in the event that the front wheels lock, it is arrange for one rear wheel to be underbraked to retain a good vehicle speed reference.

7. An EHB system as claimed in claim 1, having means whereby, in the event that the front wheels lock, it is arranged for the pressure in the rear brakes to be increased to ensure that they lock.

8. An EHB system as claimed in claim 1, wherein EHB control of the rear brakes is achieved via a special demand table that uses only the master-cylinder pressure server and the two front-brake-pressure sensors.

* * * * *